United States Patent Office 3,075,848
Patented Jan. 29, 1963

3,075,848
REFRACTORY COMPOSITIONS
Ben Davies and Albert L. Renkey, Pittsburgh, Pa., assignors to Harbison-Walker Refractories Company, Pittsburgh, Pa., a corporation of Pennsylvania
No Drawing. Filed Dec. 5, 1960, Ser. No. 73,537
7 Claims. (Cl. 106—58)

This invention relates to compositions and shapes of refractory materials, composed essentially of basic and other non-acid refractory aggregates, for high temperature applications, and includes such products as ramming and casting mixes and unburned brick.

Ramming mixtures are composed of ground refractory materials, graded as to relative proportions of different particle sizes and frequently including minor amounts of other materials for bonding purposes as well as materials to render the mixtures workable. Some ramming mixes are shipped in plastic form ready to apply. Others are supplied in dry form and are prepared for use by adding the proper amount of water and mixing. When rammed into place, the material sets to form a dense monolithic refractory, as it dries, or as reactions such as hydyrate-formation occur.

Casting mixes are similar in composition to ramming mixes with the exception that sufficient water is included so that the material can be flowed into place rather than being tamped or air rammed.

Ramming mixes of basic compositions, particularly of dead burned magnesite, are widely used in the installation of basic open hearth and electric furnace bottoms as well as for patching walls, tap holes, bottoms and the like. Casting mixes are employed in making furnace walls and bottoms of monolithic construction, for making bodies of special shapes, for patching brickwork and in similar applications.

Casting and ramming compositions are not fired prior to use or installation. Accordingly, one characteristic that is essential to such compositions is adequate bonding and mechanical strength from the time they are applied, up through the intermediate temperature range encountered prior to actual in situ firing wherein their normal ceramic bond is produced. The bonding materials presently used in these compositions perform satisfactorily for one or the other of the essential bonding functions. That is, they impart adequate dry strength or strength in the intermediate temperature range (1000 to 2000° F.), but do not serve both functions. Therefore, there is an acknowledged need for a bonding material for refractory casting and ramming mixes which would take a strong set and be characterized by good strength both under atmospheric conditions and in the intermediate temperature range to which they are subjected.

Unburned brick are generally bonded with one or more chemical substances which impart strength to the brick after curing or drying. Such bonding substances may include nitre cake, Epsom salts, lignin products, organic adhesives and the like. However, all known chemical bonds lose strength when heated to temperatures between 1000° and 2000° F. That characteristic is the great disadvantage of unburned brick as compared with burned refractories. The consequence of this characteristic is that after the brick are installed in the furnace structure and are heated, the end of brick exposed to the furnace heat may separate from the body at a weak zone. Indeed, such happenings have caused some very expensive furnace shutdowns.

It is, therefore, a primary object of the present invention to provide compositions and shapes such as refractory casting and ramming compositions and unburned brick that are characterized by a bonding material that takes a natural set and which characterizes the resulting product with an exceptional combination of strength under atmospheric conditions and at intermediate temperatures.

This and other objects are attained in accordance with our invention in refractory compositions composed of basic and other non-acid refractory aggregates by use therein of a combination bonding material that serves to provide a hydraulic type set and gives strength upon drying and in the intermediate temperature range. This bonding material is composed of fine amorphous silica and of sodium silicate in which the ratio of soda ($Na_2O$) to silica ($SiO_2$) conforms to a critical ratio. Based on the weight of the resulting batch, 1 to 5 weight percent of the silica and 1½ to 5 weight percent of the silicate are used. Surprisingly, the resulting products show far greater strength than would be expected upon adding the individual effects of the separate constituents and it is, therefore, concluded that in some manner the components of the bonding material uniquely cooperate to exert a synergistic effect.

The silica that is used in practicing the present invention is known as volatilized silica or fume silica. Such materials are made, for example, as the silica condensate collected from furnaces manufacturing silicon alloys such as ferro silicon. As used in this invention, the silica is substantially all finer than 325 Tyler mesh (44 microns) and over 50 percent finer than 10 microns. Chemically, the material is at least 90 percent $SiO_2$ and commonly is about 95 percent $SiO_2$ with about 2 to 3 percent of a combination of iron, magnesium and aluminum oxides and the remainder showing as ignition loss. Carbon may comprise much of the ignition loss. These silica materials generally are considered amorphous, though it will be appreciated that some degree of crystallinity may be present.

The sodium silicate that is used in the present invention is characterized by a silica content that is within the range of 160 to 240 weight percent of the soda present. On a more common basis, the soda to silica ratios are from 1:1.6 to 1:2.4. For reference purposes, it may be noted that the common water glass of commerce is characterized by a ratio of soda to silica of about 1:3.3. Sodium silicates with the stated critical ratio are available commercially and generally are obtained as a 65 Tyler mesh powder which is highly soluble in water. A typical chemical composition, in weight percent, of such a commercial sodium silicate is as follows:

$Na_2O$ _____ 27.5
$SiO_2$ _____ 55.0
$H_2O$ _____ 17.5

It will be appreciated that other sodium silicates can be used as long as the soda-silica ratio falls within the critical limits above specified.

The components of the bonding materials can be used in the same manner that bonding materials are presently used in forming ramming or casting compositions or unburned brick. That is, the silica and sodium silicate are incorporated in a refractory batch by mixing. These constituents can be added separately or together after having first been blended in a mixer.

The casting and ramming compositions and unburned shapes of the invention include, in addition to the sodium silicate and amorphous silica, refractory aggregates of basic or non-acid materials such as dead burned magnesite, chrome ore, olivine, and the like as well as mixtures of such materials. While the preferred compositions suitably are composed of the foregoing basic and non-acid refractory aggregates, it will be appreciated that minor amounts of a few percent of such other aggregates as calcined alumina, calcined bauxite, calcined clay, and the like may also be included. Where a plasticizing agent is desired for any reason, such materials as crude clay or bentonite in amounts of about 2 to 3 percent can be used.

The invention will be exemplified by way of specific examples. In these examples, the aggregate used is dead burned magnesite but it should be appreciated that other aggregates could be used as well.

Dead burned magnesite prepared synthetically from sea water or brines is the preferred aggregate, for its provides a higher refractoriness than can be obtained with natural dead burned magnesite. Typical analyses, on a weight basis, of natural and sea water magnesites are:

*Nevada Magnesite*

| | Percent |
|---|---|
| MgO | 85.7 |
| CaO | 5.09 |
| $SiO_2$ | 4.34 |
| $Fe_2O_3$ | 4.05 |
| $Al_2O_3$ | 0.79 |

*Sea Water Magnesite*

| | Percent |
|---|---|
| MgO | 95.1 |
| CaO | 1.3 |
| $SiO_2$ | 2.7 |
| $Fe_2O_3$ | 0.6 |
| $Al_2O_3$ | 0.3 |

In the following examples, the dead burned magnesite was ground and sized and the amorphous silica and sodium silicate (1:1.6 $Na_2O$ to $SiO_2$ ratio) blended therewith to give a screen analysis (Tyler mesh) as follows:

| | Percent |
|---|---|
| −4+10 mesh | 28 |
| −10+28 | 28 |
| −28+65 | 7 |
| −65 | 37 |

The batches were dry mixed for about five minutes and then about 3 to 6 percent of water was added and the ingredients thoroughly mixed. Each batch was then rammed at about 3000 p.s.i. into sized specimens measuring 9 x 4½ x 2½ inches, for testing, and dried for about 10 hours at 230° F. A first group of the batches used sea water magnesite, while Nevada magnesite was used in a second group for comparison purposes.

The data on the sea water magnesite batches are:

The data obtained on the batches containing dead burned Nevada magnesite are:

TABLE II

| | S | T | U | V | W | X | Y |
|---|---|---|---|---|---|---|---|
| Nevada magnesite, percent | 99 | 97 | 95 | 98 | 96 | 95 | 95 |
| Amorphous silica | 1 | 3 | 5 | | 4 | 3 | 2 |
| Sodium silicate | | | | 2 | | 2 | 3 |
| Modulus of rupture, p.s.i.: | | | | | | | |
| After drying | 150 | 200 | 220 | 210 | 1,110 | 1,480 | 2,200 |
| At 1,500° F. (30 hour hold) | 90 | 120 | 130 | 110 | 550 | 650 | 1,200 |
| Bulk density, p.c.f. | 164 | 167 | 168 | 167 | 170 | 178 | 176 |

It will be noted from the data in Tables I and II that Examples A through F and S through W contained but one component of the bond. It can be seen from the data presented that with the single component, either the modulus of rupture after drying is very poor or the modulus of rupture at 1500° F. is low, or both are unsatisfactory. On the other hand, the use of both the amorphous silica and the sodium silicate, as in the present invention, and as shown in Examples G to R, X and Y, the values for each of these properties is higher in one or both instances even at the limits of the invention. For compositions around the preferred two percent of the silica and three percent of the silicate are present (K, X, and Y), especially high values for both properties are attained. It is interesting to note that the bond of the present invention in an amount of five percent exceeds the aggregate values for the specified properties of separate additions of as much as seven percent of these materials used singly. For example, in run K, the modulus of rupture after drying was 2350 p.s.i. while that at 1500° F. was 1200 p.s.i. The modulus of rupture in Example B, where the bond consisted of three percent of amorphous silica, was 280 and at 1500° F. was 80 p.s.i. Those properties under Example E, where four percent of the silicate was used, are 1030 and 800 p.s.i., respectively. Hence, our preferred compositions show far better properties than the combined effects of each material would suggest to be possible.

Comparing the results obtained with the Nevada magnesite compositions under similar circumstances, it can be noted that similar surprising improvement has been achieved. As is evident, these sharply improved properties will greatly enhance the utility of the compositions made in accordance with this invention in that they can withstand more severe conditions and less careful handling than can prior art compositions. As is also evident from the data presented, the preferred compositions contain each of the constituents in an amount of 2 to 3 percent. While strength is present in the test pieces even in quantities of about five percent in each of these materials, it is preferred to avoid these higher bond contents because cracking and bloating can occur. Moreover, high amounts of the bonding materials can begin to exert a deleterious effect upon the refractoriness of the mixes. Of course, on a strength to cost basis, it is evident that the preferred compositions are far superior to those containing the higher bond contents.

It has been noted above that the ratio of the soda to

TABLE I

| | A | B | C | D | E | F | G | H | I | J | K | L | M | N | O | P | Q | R |
|---|---|---|---|---|---|---|---|---|---|---|---|---|---|---|---|---|---|---|
| Seawater magnesite, percent | 99 | 97 | 95 | 98 | 96 | 94 | 97 | 96 | 95 | 96 | 95 | 93 | 95 | 94 | 93 | 93 | 92 | 90 |
| Amorphous silica | 1 | 3 | 5 | | | | 1 | 1 | 1 | 2 | 2 | 2 | 3 | 3 | 3 | 5 | 5 | 5 |
| Sodium silicate | | | | 2 | 4 | 6 | 1 | 3 | 4 | 2 | 3 | 5 | 1 | 3 | 4 | 2 | 3 | 5 |
| Modulus of rupture, p.s.i.: | | | | | | | | | | | | | | | | | | |
| After drying | 240 | 280 | 280 | 170 | 1,030 | 1,350 | 320 | 1,250 | 2,110 | 1,250 | 2,350 | 2,500 | 400 | 2,300 | 2,370 | 1,410 | 1,610 | 2,560 |
| At 1,500° F. (30 hour hold) | 50 | 80 | 120 | 170 | 800 | 850 | 200 | 860 | 1,100 | 880 | 1,200 | 1,110 | 350 | 1,150 | 1,100 | 1,000 | 1,010 | 1,200 |
| Bulk density, p.c.f. | 165 | 167 | 168 | 168 | 170 | 171 | 169 | 173 | 175 | 177 | 178 | 178 | 176 | 177 | 178 | 177 | 176 | 175 | silica in the silicates used in this invention must be within a critical ratio. As evidence of this, test pieces were made that varied only in the ratio of soda to silica in the silicate component. In the following examples, the mix used was 98 percent sea water magnesite and two percent of amorphous silica. Three percent by weight of sodium silicate was added to each. The data obtained in this series of tests are as follows:

TABLE III

| $Na_2O:SiO_2$ ratio | Bulk density, p.c.f. | Modulus of rupture | |
|---|---|---|---|
| | | After drying, p.s.i. | At 1,500° F. (30 hour hold), p.s.i. |
| (1) 1:1.6 | 178 | 2,590 | 1,340 |
| (2) 1:2.0 | 178 | 2,350 | 1,200 |
| (3) 1:2.4 | 175 | 2,100 | 1,010 |
| (4) 1:2.6 | 171 | 1,400 | 590 |
| (5) 1:2.9 | 170 | 1,200 | (1) |
| (6) 1:3.22 | 166 | 1,080 | 320 |
| (7) 1:3.75 | 163 | 660 | (1) |

[1] Not available.

From these data, it is evident that when the silica content exceeds that present in the 1:2.4 ratio (Examples 4 through 7), a sharply decreasing value for the modulus of rupture is obtained. It is deemed that these data are remarkedly demonstrative of the criticality of the soda-silica ratio. It is further evident from these data that the preferred soda-silica ratio is within the range of 1:1.6 to 1:2.

As noted hereinbefore, our invention also provides unburned basic brick having good strength in the intermediate temperature range. In the following examples, there are compared unburned magnesite brick, one (Z) being conventional chemically bonded brick with ball clay as a plasticizer and waste sulfite liquor as bond and the other (AA) being a similar brick in which the amorphous silica-sodium silicate bond of this invention is used. In forming these brick, the dead burned magnesite was graded for pressing a dense brick; a typical grind is:

| | Percent |
|---|---|
| −6+10 mesh | 17 |
| −10+28 | 30 |
| −28+65 | 5 |
| −65 | 48 |

The solids were dry mixed and then sulfite liquor and water, respectively, were added. Brick 9 x 4½ x 2½" were pressed at 8000 p.s.i. and dried at 230° F. The data obtained on the batches and brick are:

TABLE IV

| | Z | AA |
|---|---|---|
| Seawater magnesite, percent | 97 | 95 |
| Ball clay | 3 | |
| Amorphous silica | | 2 |
| Sodium silicate | | 3 |
| Waste sulfite liquor (added) | 5 | |
| Water (added) | | 3 |
| Modulus of rupture, p.s.i.: | | |
| After drying | 1,200 | 2,670 |
| At 1,500° F. (30 hour hold) | 260 | 1,000 |
| Bulk density, p.c.f. | 174 | 174 |

These data again demonstrate the increase in strength at room and intermediate temperatures characteristic of the present invention. Accordingly, the invention is available for preparing brick for open hearth walls and roofs where resistance to spalling is desired.

From the foregoing data and description, it is evident that our invention provides unique setting, casting and ramming mixes as well as unburned brick for high temperature applications, that demonstrate exceptional strength at both low and intermediate temperatures. This remarkable result has been achieved without material change in the manner of forming these compositions, so that it is evident that these results can be applied in industry generally with the skills presently available.

According to the provisions of the patent statutes, we have explained the principle of our invention and have described what we now consider to represent its best embodiment. However, we desire to have it understood that, within the scope of the appended claims the invention may be practiced otherwise than as specifically described.

We claim:

1. Refractory ramming and casting compositions for mixing with tempering fluid for fabrication of unfired refractory shapes characterized by having improved strength through low and intermediate temperature ranges, and on a solids basis consisting essentially of a dry mixture of, by weight, 1 to 5% of volatilized silica, 1½ to 5% of sodium silicate in which the soda-silica ratio is within the range of 1.16 to 1.24, and the remainder non-acid refractory aggregate.

2. Refractory ramming and casting compositions for mixing with tempering fluid for fabrication of unfired refractory shapes characterized by having improved strength through low and intermediate temperature ranges, and on a solids basis consisting essentially of a dry mixture of, by weight, 1 to 5% of volatilized silica, 1½ to 5% of sodium silicate in which the soda-silica ratio is within the range of 1.16 to 1.24, and the remainder at least one member selected from the group consisting of dead burned magnesite, chrome ore, and olivine.

3. Refractory ramming and casting compositions for mixing with tempering fluid for fabrication of unfired refractory shapes characterized by having improved strength through low and intermediate temperature ranges, and on a solids basis consisting essentially of a dry mixture of, by weight, 1 to 5% of volatilized silica, 1½ to 5% of sodium silicate in which the soda-silica ratio is within the range of 1.16 to 1.24, up to about 3% of a plasticizing agent, and the remainder non-acid refractory aggregate.

4. In unconsolidated, size graded, dry, non-acid refractory material for mixing with tempering fluid for gunning or casting operations, the improvement which comprises adding, on a total solids basis, 1 to 5% of volatilized silica, and 1½ to 5% of sodium silicate in which the soda-silica ratio is within the range of 1.16 to 1.24.

5. In unconsolidated, size graded, dry, non-acid refractory material for mixing with tempering fluid for gunning or casting operations, the improvement which comprises adding, on a total solids basis, 1 to 5% of volatilized silica, 1½ to 5% of sodium silicate in which the soda-silica ratio is within the range of 1.16 to 1.24, and up to about 3% of a plasticizing agent.

6. A composition in accordance with claim 1 in which said volatilized silica and sodium silicate each comprise about 2 to 3 percent of the resulting composition.

7. A composition in accordance with claim 2 in which said volatilized silica content and sodium silicate content each are within the range of about 2 to 3 percent and said aggregate is dead burned magnesite.

References Cited in the file of this patent

UNITED STATES PATENTS 2,322,274    Birch et al.    June 22, 1943
2,571,102    Austin    Oct. 16, 1951

UNITED STATES PATENT OFFICE
CERTIFICATE OF CORRECTION

Patent No. 3,075,848                                  January 29, 1963

Ben Davies et al.

It is hereby certified that error appears in the above numbered patent requiring correction and that the said Letters Patent should read as corrected below.

Column 6, lines 24, 33, 43, 51 and 57, for "1.16 to 1.24", each occurrence, read -- 1:1.6 to 1:2.4 --.

Signed and sealed this 18th day of January 1966.

(SEAL)
Attest:

ERNEST W. SWIDER                              EDWARD J. BRENNER
Attesting Officer                                     Commissioner of Patents